US009868892B2

(12) United States Patent
Bhaduri

(10) Patent No.: US 9,868,892 B2
(45) Date of Patent: Jan. 16, 2018

(54) METHOD OF FORMING FLUID IMPERMEABLE PLUG IN A SUBTERRANEAN FORMATION

(71) Applicant: Baker Hughes Incorporated, Houston, TX (US)

(72) Inventor: Sumit Bhaduri, Spring, TX (US)

(73) Assignee: Baker Hughes, a GE company, LLC, Houston, TX (US)

(*) Notice: Subject to any disclaimer, the term of this patent is extended or adjusted under 35 U.S.C. 154(b) by 515 days.

(21) Appl. No.: 14/057,069

(22) Filed: Oct. 18, 2013

(65) Prior Publication Data

US 2014/0110113 A1   Apr. 24, 2014

Related U.S. Application Data

(60) Provisional application No. 61/718,180, filed on Oct. 24, 2012.

(51) Int. Cl.
| | | |
|---|---|---|
| *E21B 33/13* | (2006.01) | |
| *C09K 8/42* | (2006.01) | |
| *C09K 8/50* | (2006.01) | |
| *E21B 33/138* | (2006.01) | |
| *C09K 8/512* | (2006.01) | |
| *C09K 8/588* | (2006.01) | |

(52) U.S. Cl.
CPC ............. *C09K 8/426* (2013.01); *C09K 8/50* (2013.01); *C09K 8/512* (2013.01); *C09K 8/588* (2013.01); *E21B 33/138* (2013.01)

(58) Field of Classification Search
CPC ........ C09K 8/426; C09K 8/512; C09K 8/588; E21B 33/138; E21B 33/13
See application file for complete search history.

(56) References Cited

U.S. PATENT DOCUMENTS

| | | | | |
|---|---|---|---|---|
| 3,795,276 A | * | 3/1974 | Eilers | C09K 8/887 166/294 |
| 4,069,869 A | * | 1/1978 | Sandiford | C09K 8/512 166/270 |

(Continued)

FOREIGN PATENT DOCUMENTS

| | | |
|---|---|---|
| CA | 2081270 A1 | 4/1993 |
| DE | 69207549 T2 | 5/1996 |

(Continued)

OTHER PUBLICATIONS

Ahmad Moradi-Araghi; "Application of Low-Toxicity Crosslinking Systems in Production of Thermally Stable Gels"; SPE/DOE 27826; 1994; pp. 483-491; Society of Petroleum Engineers; Richardson, Texas.

(Continued)

*Primary Examiner* — Zakiya W Bates
*Assistant Examiner* — Crystal J Miller
(74) *Attorney, Agent, or Firm* — John Wilson Jones; Jones Delflache LLP

(57) ABSTRACT

Water and gas flow into a subterranean reservoir may be reduced by pumping into the reservoir a multi-aldehyde crosslinking agent and a low molecular weight polyacrylamide capable of crosslinking with the crosslinking agent. The reaction product forms a gel plug impermeable to water and gas.

19 Claims, 1 Drawing Sheet

(56) References Cited

U.S. PATENT DOCUMENTS

| | | | | |
|---|---|---|---|---|
| 4,155,405 A * | 5/1979 | Vio | C09K 8/512 | |
| | | | 166/295 | |
| 4,182,417 A * | 1/1980 | McDonald | C09K 8/512 | |
| | | | 166/295 | |
| 4,217,425 A | 8/1980 | Ballweber et al. | | |
| 4,233,411 A | 11/1980 | Ballweber et al. | | |
| 4,282,928 A * | 8/1981 | McDonald | C09K 8/035 | |
| | | | 166/268 | |
| 4,461,351 A * | 7/1984 | Falk | C09K 8/512 | |
| | | | 166/295 | |
| 4,498,540 A * | 2/1985 | Marrocco | C09K 8/512 | |
| | | | 166/295 | |
| 4,666,957 A * | 5/1987 | Marrocco | C09K 8/50 | |
| | | | 523/130 | |
| 4,772,641 A * | 9/1988 | Meltz | C08G 12/40 | |
| | | | 166/295 | |
| 4,796,700 A * | 1/1989 | Sandiford | C09K 8/12 | |
| | | | 166/270 | |
| 4,939,203 A * | 7/1990 | Marrocco | C09K 8/512 | |
| | | | 524/557 | |
| 5,399,269 A | 3/1995 | Moradi-Araghi | | |
| 5,418,217 A | 5/1995 | Hutchins et al. | | |
| 5,486,312 A | 1/1996 | Sandiford et al. | | |
| 5,617,920 A | 4/1997 | Dovan et al. | | |
| 5,849,154 A | 12/1998 | Takano et al. | | |
| 6,224,714 B1 | 5/2001 | Schroeder et al. | | |
| 6,287,418 B1 | 9/2001 | Schroeder et al. | | |
| 6,632,904 B2 | 10/2003 | Schroeder et al. | | |
| 7,034,087 B2 | 4/2006 | Hagiopol et al. | | |
| 7,119,148 B2 | 10/2006 | Hagiopol et al. | | |
| 7,157,407 B2 | 1/2007 | Serizawa | | |
| 7,331,390 B2 | 2/2008 | Eoff et al. | | |
| 7,488,403 B2 | 2/2009 | Hagiopol et al. | | |
| 7,608,665 B2 | 10/2009 | Proverb et al. | | |
| 7,727,359 B2 | 6/2010 | Proverb et al. | | |
| 7,863,395 B2 | 1/2011 | Hagiopol et al. | | |
| 7,897,013 B2 | 3/2011 | Hagiopol et al. | | |
| 7,964,669 B2 | 6/2011 | Proverb et al. | | |
| 8,152,962 B2 | 4/2012 | Koch et al. | | |
| 8,197,640 B2 | 6/2012 | Schaffer | | |
| 8,822,388 B2 * | 9/2014 | Burns | C09K 8/512 | |
| | | | 507/219 | |
| 2004/0020651 A1 * | 2/2004 | Burts, III | 166/295 | |
| 2004/0023816 A1 * | 2/2004 | Burts, III | C09K 8/665 | |
| | | | 507/200 | |
| 2008/0125334 A1 * | 5/2008 | Burns | C09K 8/512 | |
| | | | 507/219 | |

FOREIGN PATENT DOCUMENTS

| | | |
|---|---|---|
| EP | 0206723 A2 | 12/1986 |
| WO | 19940015070 A1 | 7/1994 |

OTHER PUBLICATIONS

G.A. Al-Muntasheri et al; Investigation of a High Temperature Organic Water-Shutoff Gel: Reaction Mechanisms; SPE 97530; 2006; pp. 497-504; Society of Petroleum Engineers; Richardson, Texas.

R.D. Sydanski et al; "More than 12 years of Experience With a Successful Conformance-Control Polymer Gel Technology"; SPE 62561; 2000; pp. 1-11; Society of Petroleum Engineers, Richardson, Texas.

R.D. Sydanski; Acrylamide-Polymer/Chromium(III)-Carboxylate Gels for Near Wellbore Matrix Treatments; SPE 20214; SPE Advanced Technology Series vol. 1, No. 1; pp. 146-152; Society of Petroleum Engineers, Richardson, Texas.

* cited by examiner

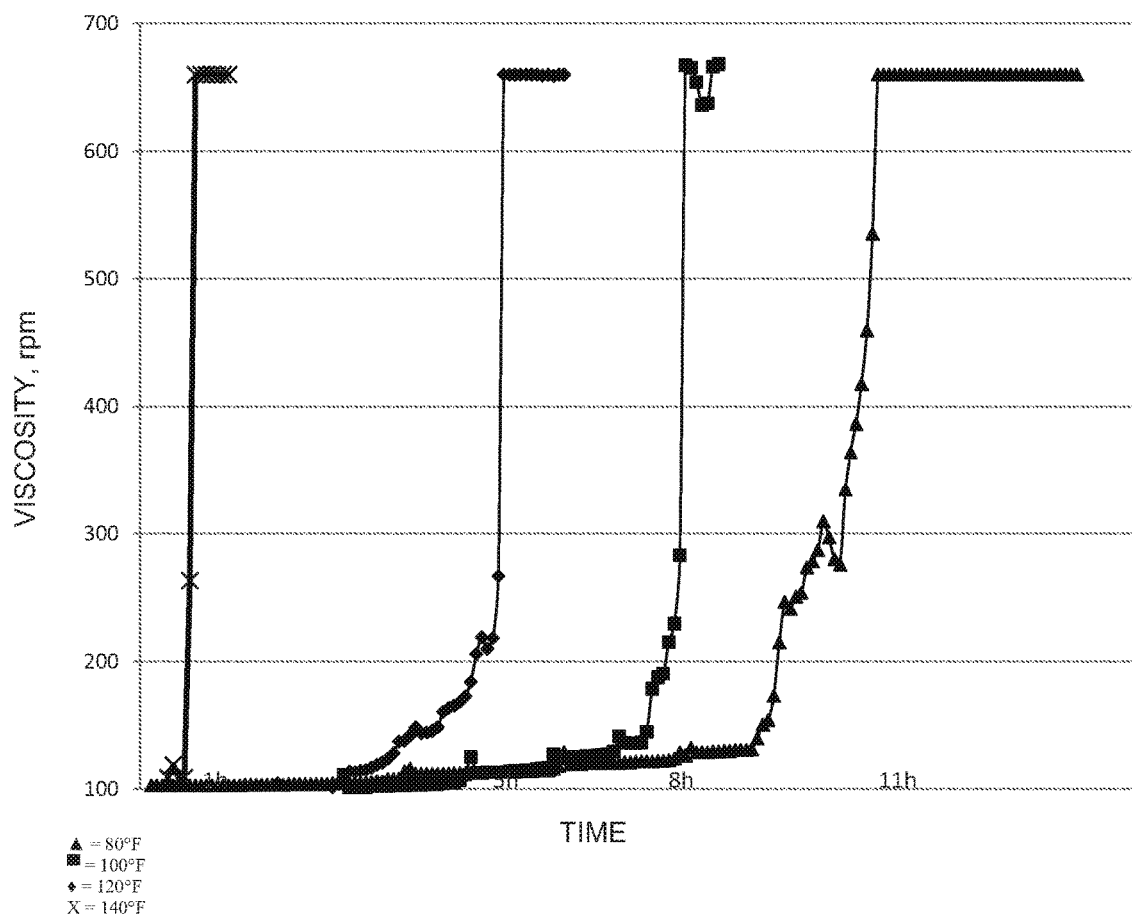

METHOD OF FORMING FLUID IMPERMEABLE PLUG IN A SUBTERRANEAN FORMATION

This application claims the benefit of U.S. patent application Ser. No. 61/718,180 filed on Oct. 24, 2012.

FIELD OF THE INVENTION

Water and gas flow through a high permeability channel in a subterranean reservoir and/or in an annular void space is reduced or stopped by pumping into the reservoir and/or void space a system comprising a low molecular weight polyacrylamide and a multi-aldehyde crosslinking agent.

BACKGROUND OF THE INVENTION

Excessive water production or a thief zone during the production phase of a subterranean formation penetrated by a well can decrease hydrocarbon production or increase costs of well operations. The amount of oil and/or gas that may be ultimately recovered from the well is decreased since the water takes the place of other fluids that may flow or be lifted from the well. Thus, excessive water production has a direct affect on the productivity of the well and increases operating expenditures. In addition, expenditures are increased due to the need for disposal of produced water in an environmentally safe manner.

In the past, gel systems have been used to control water production and reduce the flow of produced water through high permeability channels within the formation. Such gellants plug pore spaces of the formation and prevent fluid movement, often by means of a controlled, delayed chemical reaction, such as precipitation or swelling.

For instance, success has been reported with three-dimensional crosslinked polymer gel systems. Such systems include a base polymer and a crosslinking agent, both of which may be liquid concentrates in water. Depending on formation temperatures, varying ratios and concentrations of the base polymer and crosslinking agent are mixed in water and then pumped into the formation. The reaction between the base polymer and the crosslinking agent creates a strong gel barrier which shuts off or reduces water production.

For use in low temperature reservoirs, it is highly desirable for the gel systems to react quickly. A system presently used in such reservoirs is based on polyacrylamide and a metallic crosslinker, such as chromium. Representative chromium crosslinkers include chromium acetate and chromium chloride. Such crosslinkers promote a rapid exchange between the metal and the ligand of the polymer. Gelation typically occurs in less than 12 hours with low thermal activation. Treatment of reservoirs having a temperature lower than about 150° F. is possible. However, chromium based crosslinkers are not allowed in some areas due to environmental regulations.

As demands have been made for environmentally friendlier treatment chemicals, alternative systems have been sought.

SUMMARY OF THE INVENTION

The invention relates to a method of minimizing fluid loss to porous underground reservoirs or annular space by pumping into the reservoir or a void a crosslinkable fluid comprising a low molecular weight polyacrylamide and a multi-aldehyde crosslinking agent and forming a fluid impermeable reaction product from the polyacrylamide and crosslinking agent. At shallower depths, the temperatures are typically between from about 80° F. to about 150° F.

In an embodiment, a method is provided for reducing the permeability of a porous subterranean formation by pumping into the formation a multi-aldehyde crosslinking agent and a low molecular weight polyacrylamide. A fluid impermeable plug is formed in the formation from the gelled reaction product of the polyacrylamide and multi-aldehyde crosslinking agent.

In another embodiment, a method is provided for reducing fluid loss to a porous subterranean formation by pumping into the wellbore penetrating the formation a crosslinkable fluid comprising a low molecular weight polyacrylamide and a multi-aldehyde crosslinking agent. The reaction product of the polyacrylamide and multi-functional dialdehyde is gelled in the formation to form a fluid impermeable plug.

In another embodiment, a method is provided for reducing flow into a porous thief zone penetrated by a water injection wellbore by pumping into the wellbore and into the porous thief zone a crosslinkable fluid comprising a low molecular weight polyacrylamide and a multi-functional aldehyde crosslinking agent. A fluid impermeable plug is formed from the reaction product of the polyacrylamide and crosslinking agent in the porous thief zone.

In one embodiment, the polyacrylamide has a weight average molecular between from about 10,000 to about 1,000,000.

In another embodiment, the polyacrylamide is a partially hydrolyzed polyacrylamide. In one embodiment, from about 5 to 6 mole percent of the polyacrylamide is hydrolyzed. Alternative embodiments include un-hydrolyzed nonionic polyacrylamides.

In another embodiment, the multi-aldehyde crosslinking agent is selected from the group consisting of glyoxal, polyacroleins, maleimide dialdehydes and alkanedials as well as mixtures thereof.

BRIEF DESCRIPTION OF THE DRAWINGS

In order to more fully understand the drawings referred to in the detailed description of the present invention, a brief description of each drawing is presented, in which:

FIG. 1 is a graph depicting pump time to viscosity of a crosslinked fluid described herein at 80° F., 100° F., 120° F. and 140° F.

DETAILED DESCRIPTION OF THE PREFERRED EMBODIMENTS

Fluid loss to porous underground formations is minimized by pumping into the wellbore penetrating the formation a crosslinkable fluid containing a low molecular polyacrylamide and a multi-aldehyde crosslinking agent. Permeability of the porous formation is reduced by formation of the gelled reaction product of the polyacrylamide and crosslinking agent.

The crosslinking reaction between the polyacrylamide and crosslinking requires low thermal activation and offers a much reduced environmentally toxic profile than that offered by chromium based systems. Crosslinking occurs between aldehyde linkage and pendant amine groups on the polyacrylamide.

The weight average molecular weight of the polyacrylamide is from about 10,000 to about 1,000,000. In a preferred embodiment, the weight average molecular weight of the polyacrylamide is between from about 400,000 to about 600,000. Included within such polyacrylamides are low molecular weight alkylpolyacrylamides and low molecular weight copolymers of polyacrylamide and alkylpolyacrylamides (such as copolymers with ethylene, propylene and/or styrene).

The well treatment fluid typically contains between about 3 percent to about 6 percent by volume of polyacrylamide.

The crosslinking agent is a multi-aldehyde and is preferably a di-, tri- or tetra-aldehyde. Suitable multi-aldehydes include glyoxal, polyacroleins (such as polyacroleins having molecular weight less than 100), maleimide dialdehydes, as well as alkanedials such as glutaraldehyde, and 1,6-hexanedial. Mixtures of any of the described multi-aldehydes may also be used. Such crosslinking agents are more environmentally friendly and much less corrosive than those used in the systems of the prior art.

Glyoxal and glutaraldehyde are especially preferred.

Since the multi-aldehyde reacts with pendant amine moieties of the polyacrylamide, the polymer used herein may or may not be hydrolyzed. Thus, an anionic polyacrylamide, cationic polyacrylamide or neutral polyacrylamide may be used provided there are free amine groups on the polyacrylamide. For instance, the polyacrylamide may be partially hydrolyzed. As defined herein, partially hydrolyzed refers to at least 1%, but not 100%, of the functional groups of the low molecular weight polyacrylamide in the form of carboxylate groups. Typically from about 4 to about 30 mole percent, preferably from about 5 to about 10 mole percent, of the polyacrylamide is hydrolyzed. In a preferred embodiment, the polyacrylamide is neutral and is not hydrolyzed prior to pumping into the wellbore.

The crosslinking agent and the polyacrylamide may be pumped into the wellbore as separate fluids or as a single fluid.

The multifunctional-aldehyde can be used in amounts from about 0.1 percent to about 100 percent by weight of the polyacrylamide agent, but preferably are employed in amounts no greater than 5 percent. In most cases, the system described herein is insensitive to crosslinker variations above a minimum threshold value. For instance, in cases where the crosslinker loading was between from about 0.2%-0.6% for about 5% polyacrylamide (v/v), amounts up to 5x excess (3% v/v) loadings resulted in a reduction of gel code by only one code (J to I type), as described in the Examples below.

The volume of polyacrylamide and crosslinking agent injected in the zone of high permeability to be treated is determined by the size of the zone. Typically, volumes from about 5 to about 100 percent of the pore volume of the zone to be treated are used.

The viscosity of the treatment fluid may increase until the treatment fluid is very thick and prevents water inflow. For example, in some embodiments, the viscosity of the treatment fluid may increase until the treatment fluid has the properties of a rigid ringing gel. As used herein, the term "ringing gel" refers to a gel that, when formed in a container, vibrates audibly when the side of the container is struck. Depending on the concentration and temperature of the gelled fluid, a ringing gel may form within the reservoir in a time period ranging from 5 hours to 18 hours.

Typically, it is not necessary for the system defined herein to be used in conjunction with a retarder or an accelerator.

The fluid described herein is highly effective in plugging an isolated high-permeability zone or fracture at the wellbore face at considerable depth to prevent flood water from otherwise merely flowing around the plug and back into the high-permeability or swept zone. Indepth plugging of a relatively high-permeability or thief zone converts the zone into a much lower permeability zone. Subsequently injected flood water or other fluid enters the formerly by-passed, but now relatively more permeable hydrocarbon-bearing zone, and thus mobilizes increased amounts of hydrocarbons from the formation. Thus, permeability of a highly permeable zone in a subterranean formation is reduced by introducing into the formation the system described herein since the crosslinking agent is capable of crosslinking with and gelling the polyacrylamide in reservoirs having a temperature less than 150° F. to form the fluid impermeable barrier.

The system may be used in shutting off water production at formation temperatures ranging up to 150° F. In an embodiment, the system may be used in shutting off fluids in shallow water/gas zones. In such instances, the systems are capable of providing gel times and strengths at temperatures less than 80° F. The gel is primarily used after isolating the applied zones for casing leak repairs and similar cases involving limiting water entry in near wellbore applications. In a preferred embodiment, the crosslinkable fluid may be used for near wellbore gel squeeze treatments for casing leak repairs as well as a water shutoff gel. In the former, the system may be pumped into the annular space between the casing or pipe and the sides of the borehole into which the fluid loss is being encountered.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of volume percent except as may otherwise be indicated.

EXAMPLES

Example 1

To 500 cc tap water was added, with stirring at 1000 rpm in an overhead stirrer/paddle combination, 25 g of a partially hydrolyzed low molecular weight (about 500,000) polyacrylamide powder having a percent hydrolysis of about 5 to 6 mole percent. This resulted in a 5% by wt. of polymer in tap water. To 200 cc of the polymer solution prepared was then added a 0.8 cc of a 40% solution of glyoxal and the solution was mixed for 1 min in an overhead stirrer. The solution was then transferred to oven or water bath set at different temperatures. The samples were monitored visually at specified times and a gel code was assigned based on the gel code classification set forth in Table I:

TABLE I

| Gel Code | Gel Behavior | Description |
| --- | --- | --- |
| A | No gel | Appears to have same viscosity as polymer solution |
| B | Highly flowing gel | Appears to have slightly higher viscosity than polymer solution |
| C | Flowing gel | Most of the detectable gel flows to the cap when bottle inverted |
| D | Moderately flowing gel | A gel portion (5-15%) does not readily flow to the cap when bottle inverted (tonguing appears) |

TABLE I-continued

| Gel Code | Gel Behavior | Description |
|---|---|---|
| E | Barely flowing gel | Slowly flows to the cap when inverted, and a significant portion (15%+) does not flow upon inversion. |
| F | Highly deformable | Gel does not flow to the cap upon inversion. |
| G | Moderately deformable | Gel flows halfway down the bottle upon inversion. |
| H | Slightly deformable | Only gel surface deforms slightly upon inversion. |
| I | Rigid gel | Gel surface does not deform upon inversion. |
| J | Ringing rigid gel | Tuning fork-like vibration can be felt on tapping. |

The development of gel codes over time were measured and the results set forth in Table II for the 5% polymer fluid with 0.4% glyoxal (v/v):

TABLE II

| 80° F. | 0 h(A) | 1 h(A) | 2 h(A) | 3 h(A) | 6 h(A) | 12 h(J) | 24 h(J) | 96 h(J) | 120 h(J) |
|---|---|---|---|---|---|---|---|---|---|
| 100° F. | 0 h(A) | 1 h(A) | 2 h(A) | 3 h(A) | 6 h(A) | 12 h(J) | 24 h(J) | 96 h(J) | 120 h(J) |
| 120° F. | 0 h(A) | 1 h(A) | 2 h(A) | 3 h(A) | 6 h(J) | 12 h(J) | 24 h(J) | 96 h(J) | 120 h(J) |
| 140° F. | 0 h(A) | 1 h(C) | 2 h(J) | 3 h(J) | 6 h(J) | 12 h(J) | 24 h(J) | 96 h(J) | 120 h(J) |

The gels that were matured at each temperature were also monitored for long term thermal stability. The gels showed no degradation for the time periods tested. Lack of degradation was evidenced by the absence of any free water on the gel solution (polymer gel syneresis) and also no reduction of gel codes over time (gel strength). The results are set forth in Table III:

TABLE III

| 80° F. | 5 days (J) | 15 days (J) | 1 month (J) | 2 months (J) | 3 months (J) |
|---|---|---|---|---|---|
| 100° F. | 5 days (J) | 15 days (J) | 1 month (J) | 2 months (J) | 3 months (J) |
| 120° F. | 5 days (J) | 15 days (J) | 1 month (J) | 2 months (J) | 3 months (J) |
| 140° F. | 5 days (J) | 15 days (J) | 1 month (J) | 2 months (J) | 3 months (J) |

Example 2

About 25 g of the same partially hydrolyzed polyacrylamide as Example 1 was added to 500 cc tap water with stirring at 1000 rpm in an overhead stirrer/paddle combination followed by addition of 0.8 cc of a 40% solution of glyoxal. The mixture was then placed in the viscometer and the viscosity of the mixture was monitored at 1 rpm in every 3 minute intervals using a Brookfield LDV-III Viscometer equipped with a #3 LV CYL cylindrical spindle (Brookfield Engineering Laboratories, Middleboro, Mass.) and pump times were determined at 80° F., 100° F., 120° F. and 140° F., as illustrated in FIG. 1 which shows the initial increase in viscosity of the gels due to crosslinking as the gel strength increases from A (initial) to D (moderately flowing gel).

What is claimed is:

1. A method for reducing the permeability of a permeable zone within a subterranean reservoir penetrated by a wellbore with a ringing gel comprising a gelled reaction product of a polyacrylamide and multialdehyde crosslinking agent, the method comprising:
    (A) pumping into the reservoir through the wellbore:
        (a) the polyacrylamide, wherein the polyacrylamide has a weight average molecular weight between from about 10,000 to about 1,000,000; and further wherein the polyacrylamide is either
            (i) at least partially hydrolyzed; or
            (ii) at least partially hydrolyzable after being pumped into the wellbore
        (b) the multi-aldehyde crosslinking agent; and
    (B) reacting the multi-aldehyde with pendant moieties of the polyacrylamide to render the gelled reaction product and plugging the permeable zone by forming a fluid impermeable plug of the gelled reaction product in the subterranean reservoir; and
    (C) reducing permeability of the permeable zone with the fluid impermeable plug.

2. The method of claim 1, wherein the multi-aldehyde crosslinking agent is a di-, tri- or tetra-aldehyde or a mixture thereof.

3. The method of claim 2, wherein the multi-aldehyde crosslinking agent is selected from the group consisting of glyoxal, polyacroleins, maleimide dialdehydes and alkanedials as well as mixtures thereof.

4. The method of claim 3, wherein the multi-aldehyde is selected from the group consisting of glyoxal and glutaraldehyde and mixtures thereof.

5. The method of claim 3, wherein about 5 to 6 mole percent of the polyacrylamide is hydrolyzed.

6. The method of claim 1, wherein the multi-aldehyde crosslinking agent is glyoxal.

7. The method of claim 1, wherein the polyacrylamide is partially hydrolyzed.

8. The method of claim 1, wherein the weight average molecular weight of the polyacrylamide is between from about 400,000 to about 600,000.

9. The method of claim 1, wherein the temperature of the subterranean reservoir is between from about 80° F. to about 150° F.

10. The method of claim 1, wherein the ringing gel forms within the reservoir in a time period ranging from 5 hours to 18 hours.

11. A method of reducing fluid loss to a first permeable zone of a porous subterranean formation penetrated by a wellbore, the porous subterranean formation further having a second permeable zone, the method comprising:
    (a) pumping into the wellbore and to the first permeable zone:
        (i) a polyacrylamide having a weight average molecular weight between from about 400,000 to about 600,000;
        (ii) a multi-aldehyde crosslinking agent; and
    (b) gelling the reaction product of the polyacrylamide and the crosslinking agent;
    (c) reducing the loss of fluid to the first permeable zone and reducing the permeability of the first permeable zone by forming a fluid impermeable plug from the gelled reaction product and plugging the first permeable zone such that the permeability of the second permeable zone is greater than the permeability of the plugged first permeable zone.

12. The method of claim 11, wherein the multi-aldehyde crosslinking agent is a di-, tri- or tetra-aldehyde or a mixture thereof.

13. The method of claim 12, wherein the multi-aldehyde crosslinking agent is selected from the group consisting of glyoxal, polyacroleins, maleimide dialdehydes and alkanedials as well as mixtures thereof.

14. The method of claim 13, wherein the multi-aldehyde is selected from the group consisting of glyoxal and glutaraldehyde and mixtures thereof.

15. The method of claim 14, wherein the multi-aldehyde crosslinking agent is glyoxal.

16. The method of claim 11, wherein the polyacrylamide is partially hydrolyzed.

17. The method of claim 16, wherein about 5 to 6 mole percent of the polyacrylamide is hydrolyzed.

18. The method of claim 11, wherein the temperature of the subterranean reservoir is between from about 80° F. to about 150° F.

19. The method of claim 11, wherein the gelled reaction product is a ringing gel.

* * * * *